March 31, 1959 R. V. JUDY 2,880,283

TRUNK-TEST APPARATUS

Filed July 29, 1954 3 Sheets-Sheet 1

March 31, 1959 R. V. JUDY 2,880,283

TRUNK-TEST APPARATUS

Filed July 29, 1954 3 Sheets-Sheet 3

United States Patent Office 2,880,283

Patented Mar. 31, 1959

2,880,283

TRUNK-TEST APPARATUS

Robert V. Judy, Chicago, Ill., assignor to International Telephone and Telegraph Corporation, a corporation of Maryland Application July 29, 1954, Serial No. 446,571

6 Claims. (Cl. 179—175.2)

This invention relates to trunk-test apparatus, being concerned more particularly with test-trunk-connected apparatus for applying test conditions to an interexchange or interoffice trunk upon its being connected to the test trunk. The principal object is to provide a test-trunk apparatus which may be controlled selectively over a connected service trunk to apply any desired one of a number of test conditions, or sets of test conditions, to the connected service trunk.

In its preferred illustrated embodiment, the invention is applied to test trunks within an automatic exchange and is used to apply test conditions to toll trunks incoming thereto from the toll board in a distant exchange. A test trunk of the invention is reached from any incoming toll trunk upon the dialing of the test-trunk number ("0" as illustrated) over the incoming trunk. Such test number may be dialed either from the toll board or from the test desk, from which the toll trunks are also available.

A feature of the invention is that a single test trunk (or group of test trunks if one will not suffice) serves to apply the desired test conditions selectively to any service trunk under test, thereby eliminating the necessity for the additional switching apparatus heretofore commonly used to select test trunks (or groups thereof) respectively arranged for the several test conditions.

Other objects and features will appear hereinafter.

Figure 1:
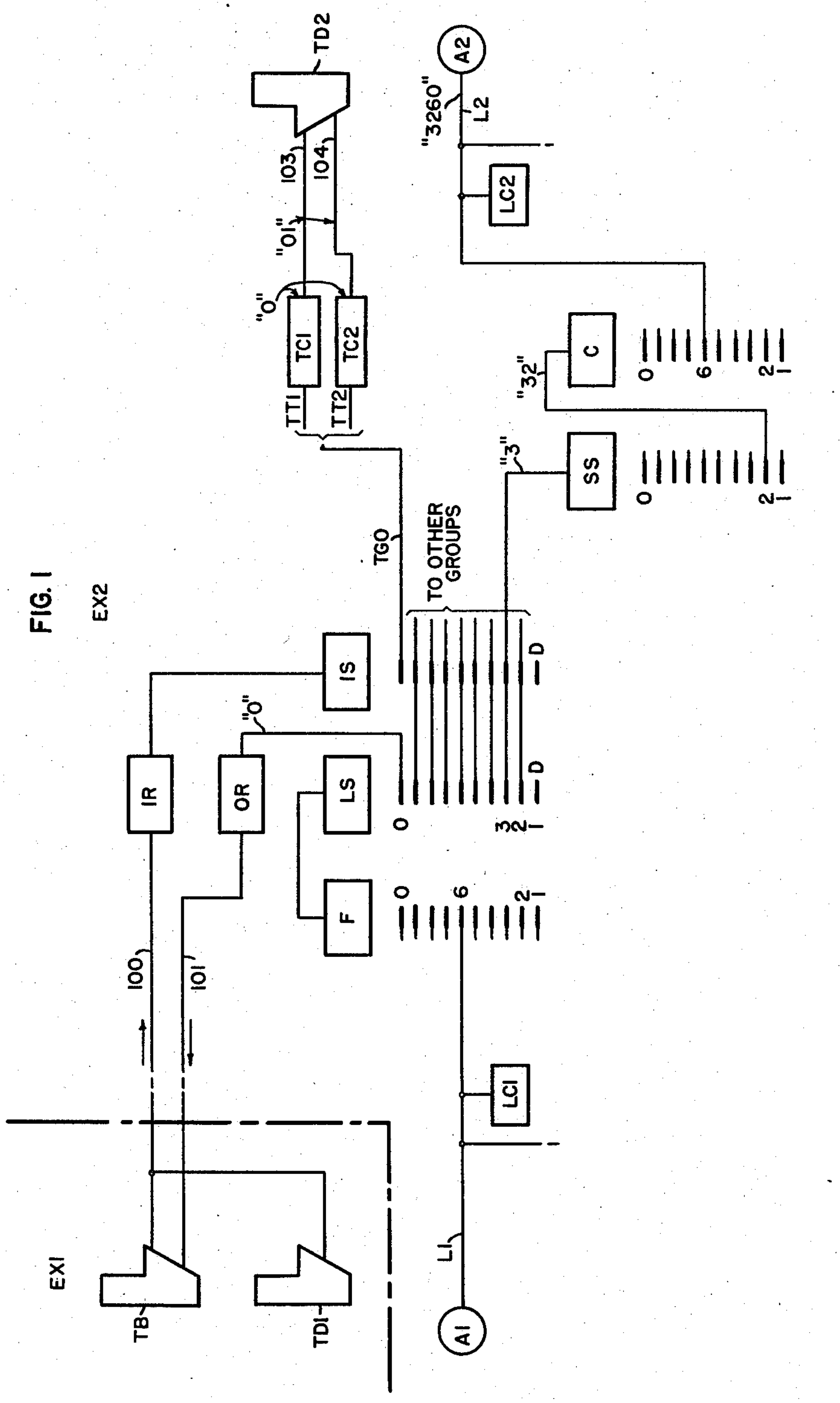
Figure 2:
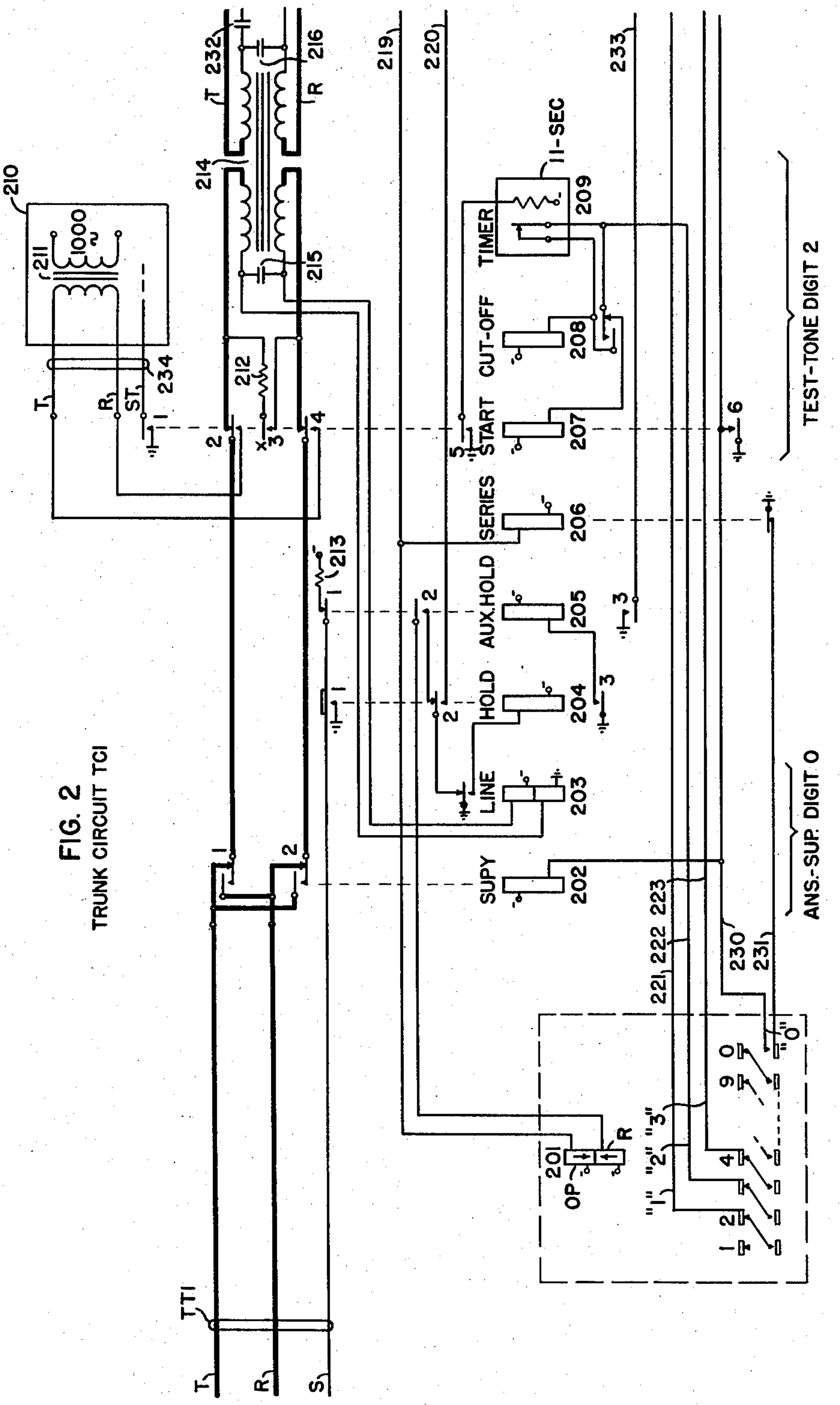
Figure 3:
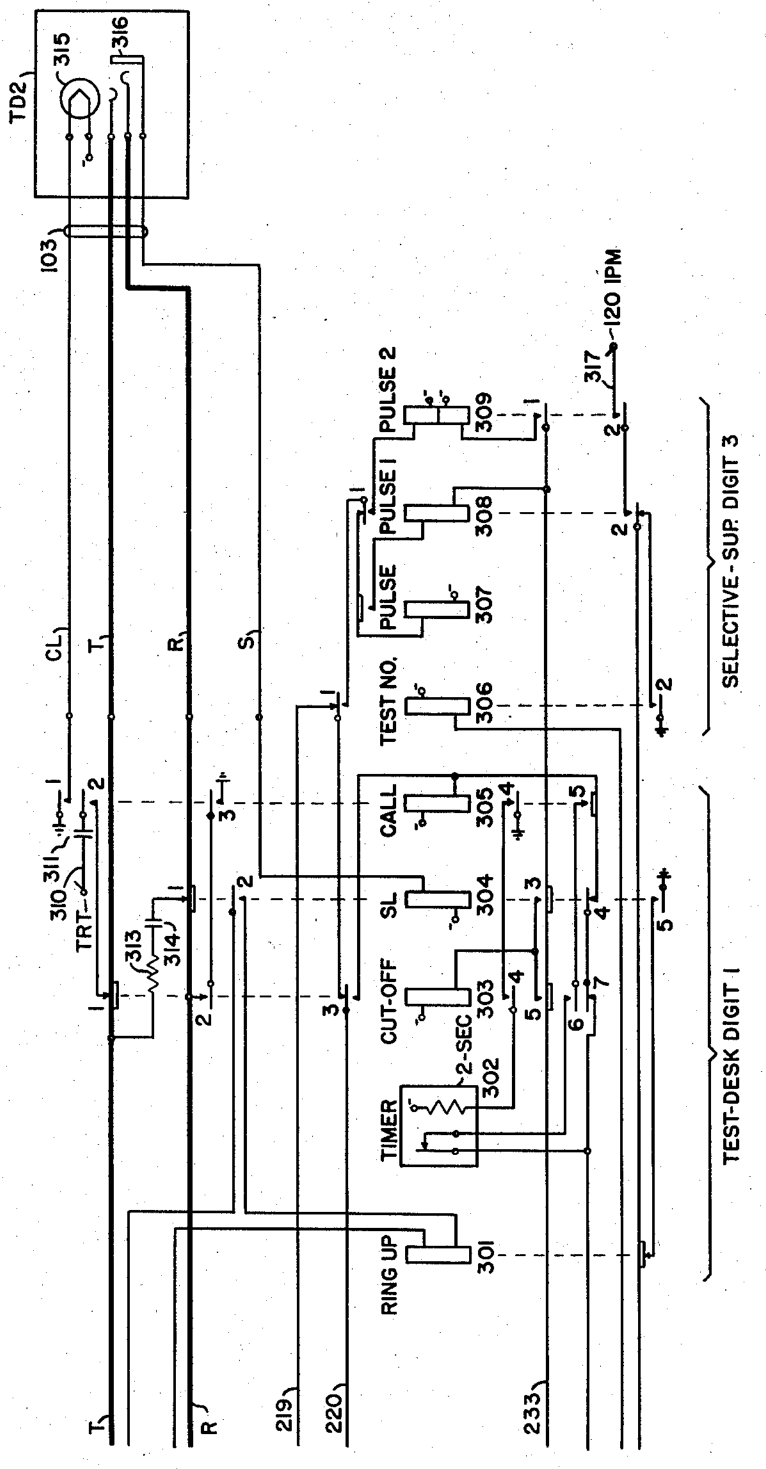

Of the accompanying drawings, comprising Figs. 1 to 3, Fig. 1 is a switching diagram of a telephone system using trunk-test apparatus according to the invention, and Figs. 2 and 3 are a circuit diagram of a trunk-test apparatus incorporated in the system of Fig. 1.

I. *General description—Fig. 1*

Referring now to Fig. 1 of the drawings, the general operation of an automatic telephone switching system using trunk-test apparatus will be described.

Fig. 1 shows apparatus in exchanges EX1 and EX2, which are connected by trunks such as the one-way trunks 100 and 101.

The apparatus of EX1 includes the toll board TB and the test desk TD1 which may be of the usual design.

The apparatus of EX2 includes termination and switching equipment for the noted trunks such as 100 and 101, and for lines such as L1 and L2 for telephone stations A1 and A2. The switching and control apparatus of EX2 includes line circuits LC1 and LC2, finders F linked to local selectors LS, incoming selectors IS, second selectors SS, and connectors C, all of which may be of usual construction. Incoming and outgoing repeaters IR and OR are associated with trunks 100 and 101 in the usual manner.

The tenth level of incoming selectors IS has access to test trunks TT1 and TT2 of group TG0, which lead to the local test desk TD2 by way of trunk circuits TC1 and TC2, and extensions 103, 104. The novelty herein disclosed resides in the circuit arrangements in these trunk circuits, as shown in circuit diagram for trunk circuit TC1 in Figs. 2 and 3.

If, for example, the subscriber at A1 on line L1 desires to make a local call, as to the subscriber at A2 on line L2, he lifts his handset (not shown), listens for dial tone, and dials the number of line L2 and station A2, such as 3260. A connection from line L1 to line L2 is thereby completed in the usual manner which may include sixth level of finder F, third level of local selector LS, second level of second selector SS, and the sixth level of connector C.

Calls incoming from toll board TB to lines of exchange EX2 reach the called lines as by way of third level of IS, second level of SS, and sixth level of C, when station A of L2 is called.

Calls from lines of EX2 reach the toll board TB of EX1 by dialing the digit 0 to secure connection with a trunk such as 101.

If the operator at toll board TB or the attendant at test desk TD1, desires a test on interchange toll line or trunk such as 100, connection is made to such trunk 100 in the usual manner to seize an incoming selector IS by way of the associated repeater IR. The operator or attendant then dials the digit 0 to cause IS to seize an idle test trunk TT1 or TT2. Upon the dialing of an additional digit, one or another test condition is imparted to the connection, or the attendant at TD2 is signalled, depending upon the value of the additional digit, as will be hereinafter described.

II. *Detailed description—Figs. 2 and 3*

Referring to Figs. 2 and 3, which show in circuit detail the apparatus TC1 of Fig. 1, it will be understood that trunk circuit TC2 is similar to the illustrated example.

IIA. *Seizure of trunk TT1*

When trunk TT1 of Figs. 1 and 2 is not in use, an idle-indicating battery potential is applied to sleeve conductor S thereof by way of resistor 213 and contacts 1 of relay 205 to mark the trunk idle to enable it to be seized by an incoming selector IS of Fig. 1. Seizure of TT1 by a selector IS (on a call from TB or TD1 over trunk 100 and repeater IR, for example) results in the closure of a bridge across conductors T and R of TT1 through the usual control contacts (not shown) of IR. Line relay 203 thereupon operates over this bridge through contacts 1 and 2 of supervisory relay 202, back contacts 2 and 4 of start relay 207, and through the left-hand windings of repeating coil 214, which has the usual by-pass condensers 215 and 216.

Line relay 203 operates hold relay 204. At its contacts 2, hold relay 204 prepares the local impulse path; at its contacts 1, it places a holding ground potential on wire S of TT1; and at its contacts 3, it operates auxiliary-hold relay 205.

At its contacts 2, auxiliary-hold relay 205 prepares a release circuit for counter 201; at its contacts 1, it opens the normal idle-indicating battery connection to wire S of TT1; and at its contacts 3, it grounds the local hold wire 233.

IIB. *Normal termination test*

Normally the talking conductors of TT1 have a standard termination load (such as 600 ohms) as represented by resistor 313 and condenser 314 bridged beyond repeating coil 214 via contacts 1 of 304.

At this time, therefore, any desired transmission test may be made over the connected trunk 100, under test, by virtue of the noted standard termination load.

IIC. *Digit 1—test desk number*

Having been seized as described, trunk circuit TC1 is now prepared to receive an additional digit (1, 2, 3, or 0) to signal the test desk TD2 or to set up a desired test condition.

If connection with TD2 is desired, the caller dials the assigned test-desk digit 1, thereby causing a single momentary interruption to be produced at IR (Fig. 1) in the control bridge of line relay 203, relay 203 momentarily restores on each such interruption impulse. Mold relay 204, being slow-restoring remains operated throughout a series of impulse-induced restorations of line relay 203.

Series relay 206 promptly operates upon restoration of line relay 203, through the back contact of relay 203, front contact 2 of hold relay 204, impulse wire 220, back contact 3 of cutoff relay 303, back contact 1 of test-number relay 306, and over wire 219. Being slow restoring, series relay 206 remains operated during the receipt of a series of impulses. Operate winding OP of counter 201, being in parallel with the winding of series relay 206, is energized momentarily over the traced circuit on each pulse restoration of the line relay 203. The device 201 (Fig. 2) is a magnetic impulse counter which may be of the type disclosed in the United States Patent No. 2,538,818, granted January 23, 1951. Counter 201 operates its contact sets 1 to 0 successively responsive to respective energizations of winding OP.

In the present example the single impulse of the digit 1 causes only the first contact set 1 of 201 to operate to effect connection with the digit-1 wire 221.

When series relay 206 restores at the end of the dialed digit 1, it grounds conductor 231 thereby extending ground to 221 through make contact 1 and break contact 2 of counter 201.

Ground on 221 operates call relay 305 via contacts 7 and 4 of 303 and 304. At its contacts 1, call relay 305 extends ground over conductor CL, of trunk 103, to light lamp 315 of test desk TD2; at its contacts 2 and 3 trunk-ring-tone current is applied to conductors T and R from trunk-ring-tone source TRT, via wire 310 and condenser 311, back contact 1 of cutoff relay 303 to conductor T, while contacts 3, of 305, extends ground through contacts 2 of relay 303 to conductor R thereby completing the trunk-ring-tone circuit. Trunk-ring-tone current is extended back over conductors T and R through repeat coil 214, contacts 2 and 4 of relay 207, contacts 1 and 2 of relay 202, to trunk TT1. Contacts 4 and 5 serve no function at this time and will be described in connection with the recall feature.

Conductors T and R are extended to TD2 via extension 103.

Lamp 315, of TD2, remains lighted until the attendant answers the call by inserting his plug (not shown) into jack 316 in the usual manner, to ground conductor S, of trunk 103, thereby operating sleeve relay 304.

At its contacts 1, sleeve relay 304 opens the normal termination load bridge; at its contacts 2, it prepares an operate circuit for ring-up relay 301; at its contacts 5, it operates supervisory relay 202 via contacts of 301 to extend reverse-battery supervision back over TT1 in the well-known manner; at its contacts 3, it operates cutoff relay 303; and at its contacts 4, it restores call relay 305.

Call relay 305 upon restoring, at its contacts 1, extinguishes lamp 315 and at its contacts 2 and 3 opens the trunk-ring-tone circuit.

At its contacts 1 and 2, cutoff relay 303 further opens the trunk-ring-tone circuit; at its break-make contacts 3, it prepares a reoperate path for relay 305 and opens the local impulse path, thereby preventing the reoperation of 201 and 206; at its contacts 7, it further opens the operate path of relay 305; at its contacts 6, it prepares a locking circuit for relay 305 if it is to be reoperated; at its contacts 4, it prepares an operate circuit for timer 302; and at its contacts 5, it locks itself operated to local hold wire 233.

The attendant at TD2 having completed the necessary test conditions may disconnect from TC1 by removing his plug from jack 316 in the usual manner, thereby restoring sleeve relay 304.

Upon restoring, relay 304 at its contacts 1 reconnects the termination load bridge; at its contacts 2, it opens the operate circuit of 301; at its contacts 3, it opens the operate circuit for relay 303, which remains operated through its own contacts 5 to ground on hold wire 233; and at its contacts 5 it restores supervisory relay 202.

If the caller desires to recall TD2 he may do so by dialing any digit, 1 to 0. The additional digits received momentarily restores relay 203 to reoperate call relay 305 via impulse wire 220, front contact of operated relay 303. Call relay 305 upon reoperating, locks itself to ground on wire 221, via contacts 6 of 303, and contacts of timer 302.

At its contacts 1, relay 305 again lights lamp 315 of test desk TD2; and at its contacts 4 it applies ground potential through operated contacts 4 of relay 303 to operate timer 302.

Timer 302 may be a delay-type of timer of the well-known by-metal type, which does not actuate its contacts for a predetermined length of time, for example, two seconds.

If the attendant at TD2 fails to answer within two seconds, timer 302 upon operating restores call relay 305.

During the two second recall period, trunk-ring-tone current is not returned back over trunk TT1 because its circuit is held opened at contacts 1 and 2 of cutoff relay 303.

Additional two second recall periods may be initiated by actuating the dial which would reoperate call relay 305 in the manner as described.

When the connection between trunk TT1 and test desk TD2 exists, the attendant at TD2 may apply ringing current over conductors T and R of 103 to operate ring-up relay 301, which has its windings bridged across conductors T and R via the right-hand windings of repeat coil 214, condenser 232, and contacts 2 of operated relay 304. Relay 301 at its contacts restores supervisory relay 202 during the time ringing current is applied to T and R.

When the caller has completed the necessary test conditions he disconnects from the incoming trunk 100 in the usual manner, thereby opening the bridge to restore line relay 203. Hold relay 204 restores shortly following the opening of its operate circuit at front contacts of relay 203. Hold relay 204 at its contacts 3 opens the operate circuit for auxiliary-hold relay 205, which restores shortly.

The interval at which relay 205 remains operated (with relays 203 and 204 restored) ground is extended from back contacts of relay 203, back contact 2 of relay 204, contacts 2 of relay 205 to the release winding R of counter 201 to restore it.

At contacts 1 of relay 204, ground is removed from sleeve conductor S of trunk TC1 and at its contacts 1 of relay 205, idle-indicating battery is connected thereto. The trunk circuit is ready to be seized for further use.

IID. *Digit 2—test tone number*

If the caller desires test tone, he dials the test-tone digit 2 after having seized TC1. Relay 203 responds, operating relay 206 and causes the second contact set 2 of counter 201 to be operated.

When series relay 206 restores at the end of the dialed digit 2, it grounds conductor 231 thereby extending ground to 222 through make contact 2 and break contact 3 of counter 201.

Ground on 221 operates start relay 207 via contacts of cutoff relay 208. At its preliminary-make contacts 3, start relay 207 places resistor 212 across conductors T and R to hold line relay 203 operated when the bridge is opened at back contacts 2 and 4 of 207. At its front contacts 2 and 4, relay 207 applies a test tone across the line from tone source 210. At its contacts 1, start relay 207 extends ground over wire ST, of trunk 234, to start the tone source 210. Tone source 210 consists of a suitable tone generator producing a thousand-cycle tone, for example, and transformer 211. The tone is extended to trunk TT1 over conductors T and R of trunk 234, contacts 2 and 4 of 207, contacts 1 and 2 of 202, to TT1. At its contacts 6, relay 207 operates supervisory relay 202 to perform the well-known supervisory functions; and at its contacts 5, it starts timer 209.

Timer 209 may be similar to timer 302, except its operate contacts close after a duration of eleven seconds, for example. After eleven seconds ground is extended from wire 222 through contacts of 209 to operate cutoff relay 208.

At its make-before-break contacts, cutoff relay 208 locks itself operated to ground on wire 222 and restores start relay 207. Upon restoring, start relay 207 at its contacts 2 and 4, removes the thousand-cycle tone from trunk TT1 and recloses the operate bridge for 203; at its contacts 3, it disconnects resistor 212; at its contacts 6, it restores supervisory relay 202; and at its contacts 5, it opens the operate circuit for timer 209.

Cutoff relay 208 remains operated, until the caller releases the connection whereby the trunk circuit TC1 is released. Counter 201 upon restoring removes ground potential from wire 222 to restore relay 208.

IIE. *Digit 3—selective supervision number*

If the caller desires selective supervision, he dials the selective supervision digit 3, after having seized TC1. Relay 203 responds, operating relay 206 and causes the third contact set 3 of counter 201 to be operated.

When series relay 206 restores at the end of the dialed digit 3, it grounds conductor 231 thereby extending ground to 223 through make contact 3 and break contact 4 of counter 201.

Ground on 223 operates test-number relay 306. At its break-make contacts 1, test-number relay 306 prepares an operate path for relay 307 and opens the local impulse path, thereby preventing the reoperation of 201 and 206; and at its contacts 2, it operates supervisory relay 202 via back contacts 2 of relay 308.

The operation of supervisory relay 202 indicates to the caller that additional digits may be dialed. The caller may then dial any digit 2 to 0 which would restore line relay 203 in the manner described. The first restoration of line relay 203 extends ground over wire 220, through back contact 3 of relay 303, front contact 1 of operated relay 306, back contact 1 of relay 308 to the battery-connected winding of pulse relay 307, operating it.

Pulse relay 307 at its contacts prepares an operate path for relay 308. During the duration of the first pulse on wire 220, relay 307 at its contacts extends ground to the winding of relay 308. Pulse-one relay 308 does not operate until the end of the first ground pulse of a series because of ground on the other side of its winding from wire 233. At the end of the first pulse, ground is removed from wire 220 thereby permitting pulse-one relay 308 to operate in series with pulse relay 307.

At its contacts 1, relay 308 prepares an operate path for pulse-two relay 309 and opens the operate path for 308; at its contacts 2, it restores supervisory relay 202 and extends the operate path for relay 202 to contacts 2 of relay 309.

Upon the receipt of the second pulse over wire 220 pulse-two relay 309 operates from ground on conductor 220 through contacts 1 of operated relay 308, and locks itself operated to ground on wire 233 through its own contacts 1.

At its contacts 2, pulse-two relay 309 applies a 120 IPM intermittent current over wire 317, via contacts 2 of operated relay 308, to intermittently operate supervisory relay 202.

The intermittent supervisory condition remains until the caller releases the trunk circuit TC1. Upon releasing TC1, ground is removed from 223 and 233 thereby restoring relays 306 to 309.

IIF. *Digit 0—answered supervision number*

If the caller desires answered supervision, he dials the answered supervision digit 0, after having seized TC1. Line relay 203 responds, operating relay 206 and causes the tenth contact set 0 of counter 201 to be operated.

When series relay 206 restores at the end of its dialed digit 0, it grounds conductor 231 thereby extending ground to 230 through make contact 0 of counter 201.

Ground on wire 230 operates relay 202. At its contacts 1 and 2 supervisory relay 202 extends reverse-battery supervision back over TT1 in the well-known manner. The standard termination load (313 and 314) remains bridged across the talking conductors during the desired transmission tests.

After the desired tests have been completed, the caller releases trunk circuit TC1 which removes ground from 230 thereby restoring relay 202.

I claim:

1. In a switching system, lines, service trunks, automatic switching apparatus and means for controlling it over a selected service trunk to extend a connection therefrom to any desired called one of the lines, a group of test trunks, means for controlling the automatic switching apparatus over the selected service trunk to select the group of test trunks and to extend a connection from such service trunk to an idle test trunk of the selected group, each test trunk having a group of alternative applying means individual thereto for applying respective test conditions over the established connection to the calling service trunk, each test trunk having a separate selecting device, each selecting device having a separate position corresponding to each of the said applying means of the trunk, means controlled over the calling service trunk and established connection for setting the selecting device of the connected test trunk into any desired one of its said positions, and means responsive to the said setting of the last said selecting device into any said position thereof for actuating the said applying means corresponding to such position.

2. In a switching system according to claim 1, each test trunk having supervisory relay means for applying alternative supervisory conditions over the connection to the calling service trunk, at least one of the said applying means of a test trunk including means for controlling the associated supervisory relay means.

3. In a switching system according to claim 1, each test trunk having supervisory relay means for applying alternative supervisory conditions over the connection to the calling service trunk, two of the said applying means of a test trunk including means for exercising separate and distinct controls over the associated supervisory relay means.

4. In a switching system, lines, service trunks, automatic switching apparatus and means for controlling it over a selected service trunk to extend a connection therefrom to any desired called one of the lines, a group of test trunks, means for controlling the automatic switching apparatus over the selected service trunk to select the group of test trunks and to extend a connection from such service trunk to an idle test trunk of the selected group, each test trunk having a group of alternative applying means individual thereto for applying respective test conditions over the established connection to the calling service trunk, and means controlled over the calling service trunk and established connection for selectively actuating the said applying means of the connected test trunk, whereby any desired test condition may be applied to the calling service trunk by a selected applying means individual to the connected test trunk, each test trunk having a supervisory relay means for applying alternative supervisory conditions over the connection to the calling service trunk, one of the said applying means of a test trunk being controllable over the calling service trunk to assume successive applying positions, and means for controlling the associated supervisory relay means differently according to the applying position assumed.

5. In a switching system, lines, service trunks, automatic switching apparatus and means for controlling it over a selected service trunk to extend a connection therefrom to any desired called one of the lines, a group of test trunks, means for controlling the automatic switching apparatus over the selected service trunk to select the group of test trunks and to extend a connection from such service trunk to an idle test trunk of the selected group, each test trunk having a group of alternative applying means individual thereto for applying respective test conditions over the established connection to the calling service trunk, and means controlled over the calling service trunk and established connection for selectively actuating the said applying means of the connected test trunk, whereby any desired test condition may be applied to the calling service trunk by a selected applying means individual to the connected test trunk, a test desk, each test trunk having a separate extension terminating at the test desk, and means in each test trunk selectively controlled over the calling service trunk and established connection for signalling the attendant at the test desk over the associated test-desk extension.

6. In a switching system according to claim 5, each test trunk including means controllable over its test-desk extension to apply test conditions selectively to the calling service trunk over the established connection.

References Cited in the file of this patent

UNITED STATES PATENTS

| | | |
|---|---|---|
| 2,101,254 | Hague | Dec. 7, 1937 |
| 2,371,989 | Griffins et al. | Mar. 20, 1945 |
| 2,389,076 | Perry | Nov. 13, 1945 |
| 2,515,696 | Creech | July 18, 1950 |
| 2,550,820 | Kessler | May 1, 1951 |
| 2,719,886 | Shoffstall | Oct. 4, 1955 |